United States Patent [19]

Streib

[11] Patent Number: 4,494,112
[45] Date of Patent: * Jan. 15, 1985

[54] ULTRASENSITIVE APPARATUS AND MONITORING METHOD FOR DETECTING CHANGE IN FLUID FLOW

[75] Inventor: Stephen F. Streib, Novato, Calif.

[73] Assignee: Chevron Research Company, San Francisco, Calif.

[*] Notice: The portion of the term of this patent subsequent to Feb. 21, 2001 has been disclaimed.

[21] Appl. No.: 409,377

[22] Filed: Aug. 18, 1982

Related U.S. Application Data

[63] Continuation-in-part of Ser. No. 184,559, Sep. 5, 1980, Pat. No. 4,433,329.

[51] Int. Cl.$^3$ .............................................. G08B 21/00
[52] U.S. Cl. .................................. 340/606; 340/517; 346/33 TP; 374/30
[58] Field of Search ...................... 340/606, 518, 517; 374/29, 30; 346/33 A, 33 P, 33 TP

[56] References Cited

U.S. PATENT DOCUMENTS

| | | | |
|---|---|---|---|
| 1,528,383 | 3/1925 | Schmidt | 374/30 |
| 3,312,966 | 4/1967 | Schaller | 340/606 |
| 3,431,149 | 3/1969 | Webb | 374/29 X |
| 3,767,470 | 10/1973 | Hines | 374/30 X |
| 4,003,250 | 1/1977 | Poppendiek et al. | 374/30 |
| 4,102,196 | 7/1978 | Holtermann | 374/30 X |
| 4,198,859 | 4/1980 | Holtermann | 374/30 |

FOREIGN PATENT DOCUMENTS 44368 12/1934 France .................. 73/204

*Primary Examiner*—James L. Rowland
*Assistant Examiner*—Daniel Myer
*Attorney, Agent, or Firm*—H. D. Messner; Edward J. Keeling

[57] ABSTRACT

Transient change in heat flux due to ultrasmall variation in flow conditions (say from NO-FLOW-to-FLOW) within a series of flowlines to pinpoint sources of plant upset is achieved, by carefully positioning a series of M transducer-meters for sensing transient heat flux, each meter being disposed at a selected location completely exterior of a flowline, and recording in sequence at a central control center for each of the M meters at least a transient signal indicative of a FLOW condition. For each meter, signals are generated by a thermopile attached to each flowline in a heat flux sensing relationship. Location takes into account the type of fluid being monitored, and the temperature gradient existing across the relief valve. Recordation of the sensed signals is via a series of M recorders and alarm circuits at the control center.

8 Claims, 7 Drawing Figures

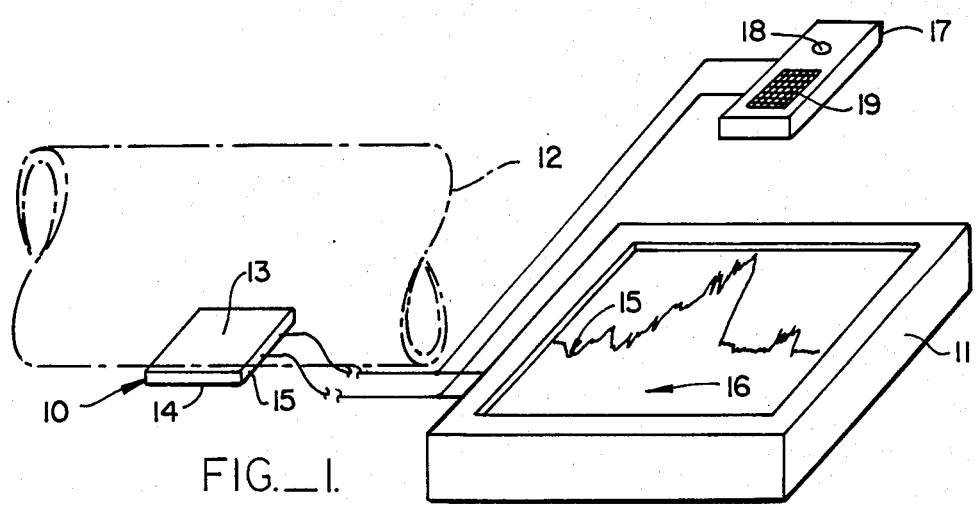
FIG._1.
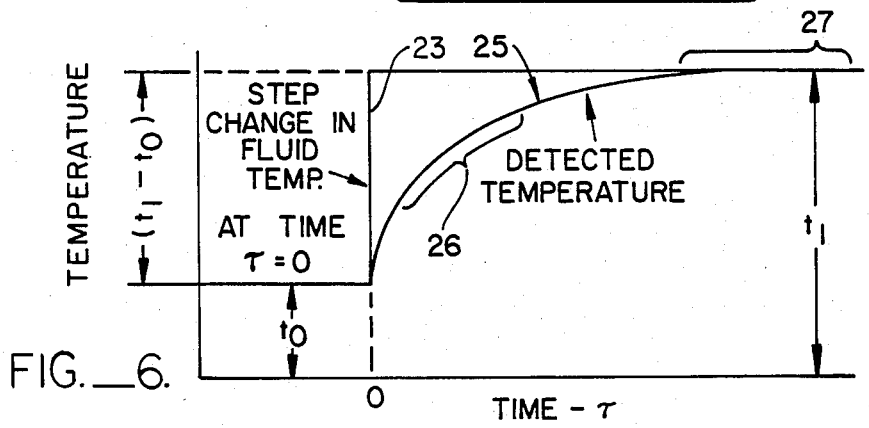
FIG._6.
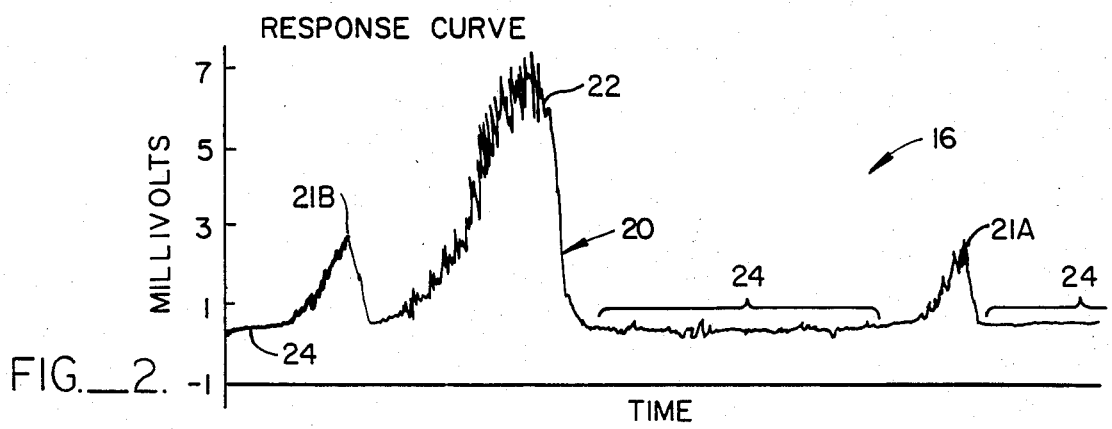
FIG._2.
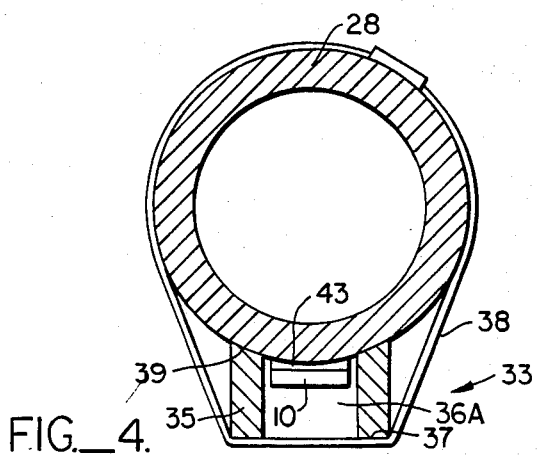
FIG._4.
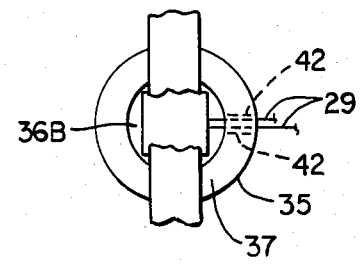
FIG._5.

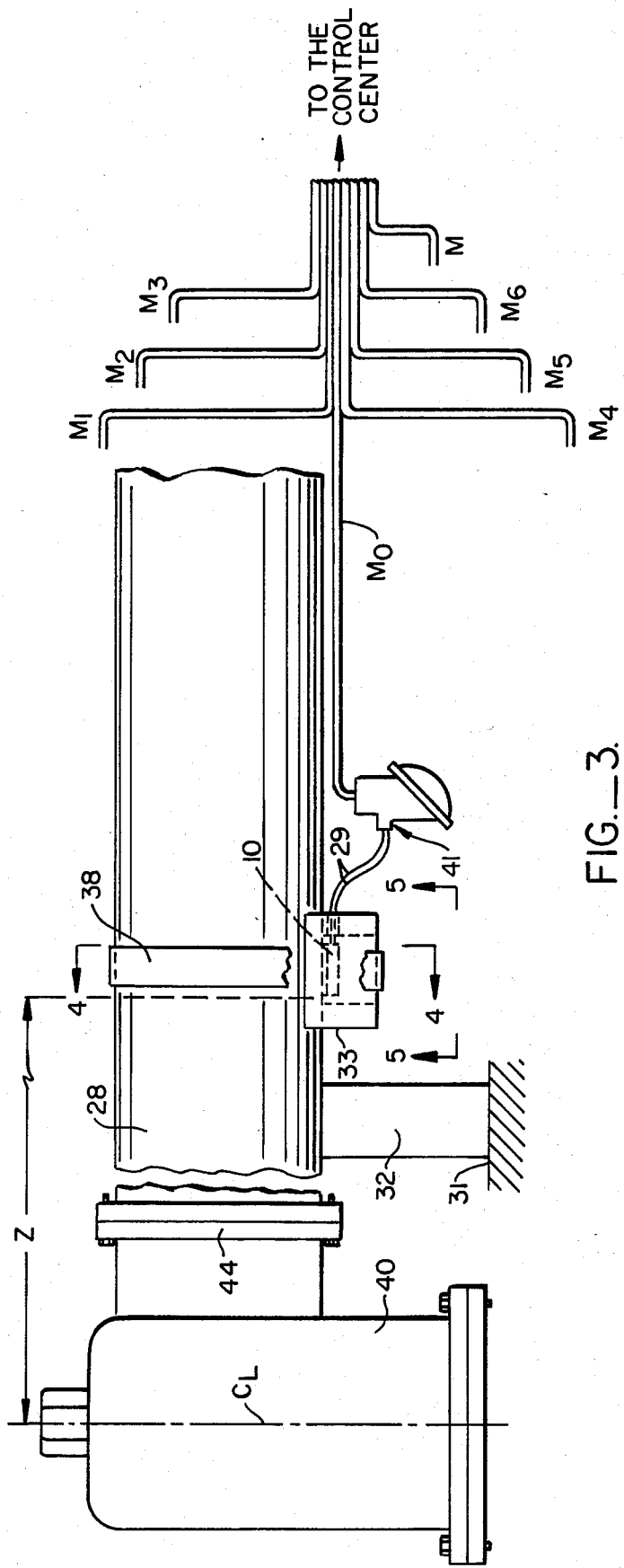
FIG._3.

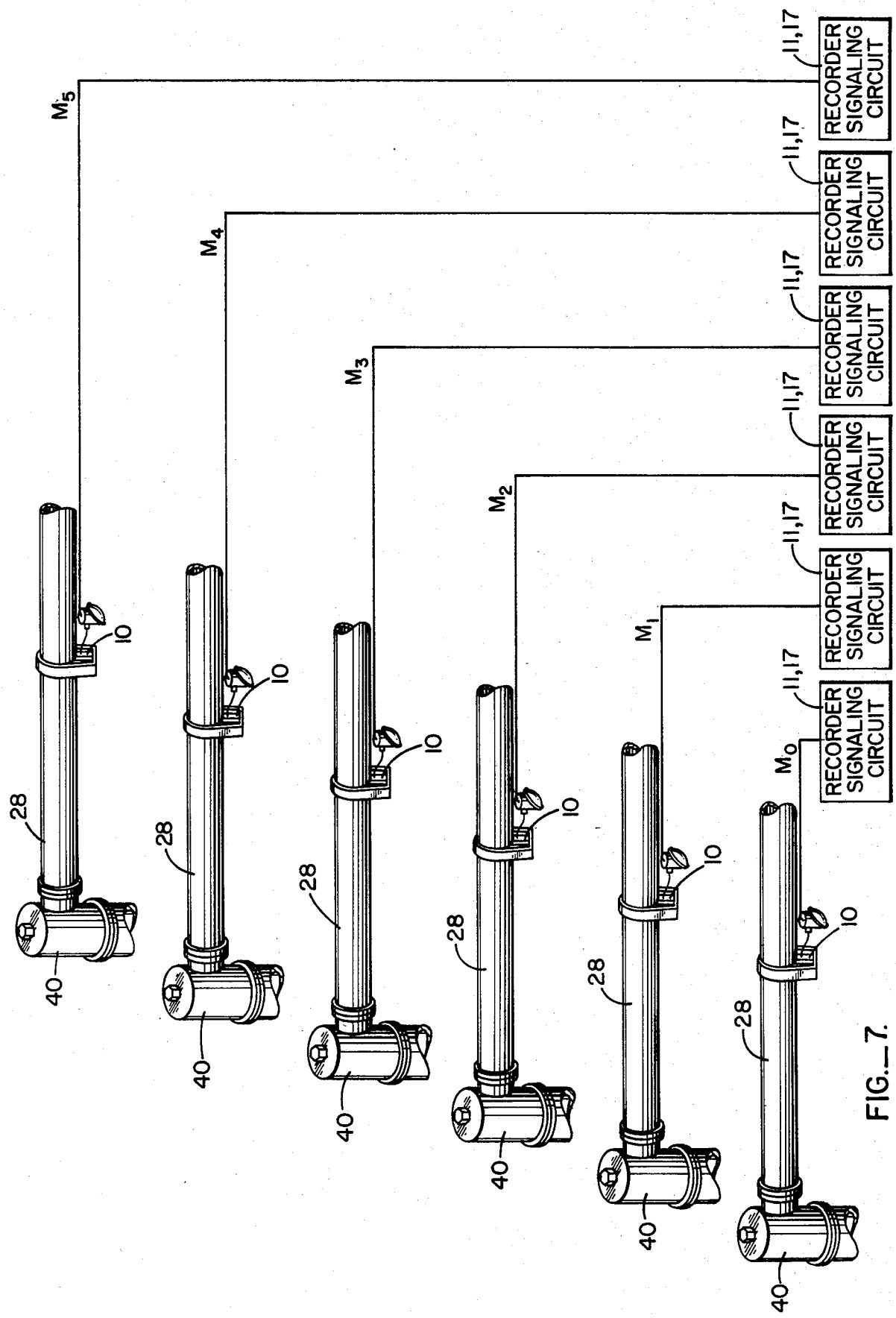
FIG._7.

4,494,112

ULTRASENSITIVE APPARATUS AND MONITORING METHOD FOR DETECTING CHANGE IN FLUID FLOW

CROSS-REFERENCE TO RELATED APPLICATIONS

This is a continuation-in-part application of Ser. No. 184,559 filed Sept. 5, 1980 for "Ultrasensitive Apparatus and Method for Detecting Change in Fluid Flow", now U.S. Pat. No. 4,433,329, issued Feb. 21, 1984.

SCOPE OF THE INVENTION

This invention relates to the monitoring of an ultrasensitive but inexpensive apparatus and method for sensing small changes in heat flux due to corresponding low flows of fluid within a body under varying conditions, especially a transient condition in which such fluid flow unexpectedly occurs.

RELATED APPLICATIONS

My following application, filed simultaneously herewith, are incorporated by reference:
(i) "Improved Ultrasensitive Apparatus and Monitoring Method for Detecting Change in Fluid Flow Condition in Relief Flowlines Associated with a Chemical or Refinery Complex", Ser. No. 409,380, now abandoned;
(ii) "Improved Ultrasensitive Apparatus and Recording Method for Detecting Change in Fluid Flow", Ser. No. 409,378, now abandoned; and
(iii) "Ultrasensitive Apparatus and Positioning Method for Detecting Change in Fluid Flow Conditions in Relief Flowlines Associated with a Chemical or Refinery Complex", Ser. No. 409,379.

In addition, applications filed previously are also incorporated by reference:
(i) "Ultrasensitive Method and Apparatus for Detecting Change in Fluid Flow Conditions in Relief Flowlines Associated with a Chemical or Refinery Complex", Ser. No. 184,560, filed Sept. 5, 1980, now U.S. Pat. No. 4,434,418, issued Feb. 28, 1984; and
(ii) "Ultrasensitive Apparatus and Method for Detecting Change in Fluid Flow Conditions in a Flowline of a Producing Oil Well, or the Like", Ser. No. 184,558, filed Sept. 5, 1980.

BACKGROUND OF THE INVENTION

The art of detection of fluid flow is replete with several classifications of inventions indexed for different purposes, say, based on type of use involved versus their principles of operation. I am unaware of any detector or method which has cascaded the output effect to detect an ultrasmall change in transient flow conditions under a variety of occurrences, especially, say, from a heat-sensing position completely exterior of the fluid-carrying body while maintaining the integrity of the interior of the body intact, i.e., without providing openings through the body itself.

In my previously filed applications of record, the transducer-meters of those disclosures are positioned completely exterior of the fluid-carrying body to be monitored. Monitoring variations in fluid flow are based on the assumption that the total system operations can be described with reference to two sequentially occurring temperature conditions: (i) a steady state temperature condition in which the body to carry the fluid, and the air surrounding the meter, are at the same temperature, and (ii) a transient condition in which change in fluid flow, say from a NO-FLOW to a FLOW condition as a control valve opens, provides a mass of fluid adjacent the meter at a temperature that differs sufficiently from that of the surrounding air to cause the generation of a transient heat flux detectable by the meter.

SUMMARY OF THE INVENTION

It has now been found that in detecting fluid-carrying bodies, as taught in my above applications, that monitoring operations are surprisingly aided if (i) each of a series of M meters is located substantially adjacent to one or more control valves controlling the flow of fluid in each associated series of flowlines, say, downstream beyond the flanged joint of each such control valve and flowline, but (ii) the corresponding series of M recorders and signaling circuits are all positioned at a central control center remote from the control valves.

Output signals of each of the series of M meters is continuously fed—without inline amplification—via M pair of conductors to the control center and thence to the series of M recorders and signaling circuits. In that way, a single operator can monitor a large flowline network without outside assistance.

That is to say, a single operator can monitor flow conditions in a multiplicity of flowlines irrespective of extent of his other duties and responsibilities. In this regard, M can range from 5 to 20 with 10 being preferred because each control center traditionally serves 10 operating units where usual refinery or chemical complex performance standards, are in effect.

Response is further aided by the fact that each of the M meters is located a distance Z from the axis of symmetry of each control valve whereby in the NO-FLOW condition a steady ambient temperature state exists in the vicinity of the meter and flowline, but in the subsequently occurring FLOW condition, a transient detection state becomes easily established. In that way, the resulting change in signal level associated with a FLOW condition is more easily identified since the detected flux level is specifically related to the transient thermal detection mode only.

DESCRIPTION OF THE DRAWINGS

FIG. 1 is a perspective view of a of heat flux indicating transducer-meter of the present invention (i) electrically connected to a recorder and to signaling circuitry but (ii) physically connected to a fluid-carrying body undergoing survey, in accordance with the present invention;

FIG. 2 is an actual plot of the signal output of an individual transducer-meter of FIG. 1, (versus time);

FIG. 3 is a side elevational view of a fluid-carrying pipeline supporting an improved form of the transducer-meter of FIG. 1;

FIG. 4 is a sectional view taken along line 4—4 of FIG. 3;

FIG. 5 is a detailed view of the transducer-meter taken in the direction of line 5—5 of FIG. 3; and FIG. 6 illustrates the transient character of the output of the transducer-meter of the present invention.

FIG. 7 is an isometric view of FIG. 3, showing additional pipelines controlled by individual control valves, situated behind and hence "hidden" by that pipeline in FIG. 3, but electrically gathered by conduits $M1 \ldots M5$ of FIG. 3, whereby positions of such control valves adjacent to a plurality of transducer-meters of the present invention are better illustrated, the latter all being electrically connected, in turn, via the conduits M1 ... M5 (in addition to conduit M0) with a like-number of recorders and signaling circuits for the purpose of monitoring the pipelines.

DESCRIPTION OF AN EMBODIMENT OF THE INVENTION

Reference should now be had to FIG. 1, illustrating apparatus and method aspects of the present invention.

As shown, a heat flux transducer-meter 10 of the present invention is serially connected to a recorder 11. The purpose of the combination: To detect and indicate ultrasmall change in fluid flow within a fluid-carrying body such as flowline 12, shown in phantom in FIG. 1, especially during the occurrence of a transient condition such as the occasion of a change in fluid flow within the body 12 from a NO-FLOW to FLOW condition.

(By the term "transducer-meter", the reader should envision the typical thermal conditions or circumstances that term describes. It is also conceivable that external circumstances such as rain, humidity and wind, for example, would effect such thermal state. The transducer-meter 10 of the present invention is contemplated as being located out-of-doors; hence, such environmental factors should be taken into account.)

In operation, the transducer-meter 10 acts as a heat probe. Its sensitivity, however, is unaffected by its small size. Even though dimensions of the exterior metallic surface plates 13 and 14 are preferably roughly 1 inch by 1 inch, sensitivities of the transducer-meter are of the range of at least 7 Btu/hr/ft$^2$ per millivolt output are conventional. The plates 13 and 14 are usually separated by an insulating board 15 onto which a plurality of N thermocouples can be etched using conventional solid state manufacturing techniques. Their termini connect with thin metallic layers or plates 13 and 14; so their outputs are cascaded, in series thermopile fashion whereby the sum of the cascaded output appears at recorder 11 as a solid state generated, temperature equatable, millivolt output. Additionally, the transducer-meter 10 has surprising sensitivity because of the cascading of the outputs of the plurality of thermocouples. At the recorder 11 the output of the meter 10 in both transient and non-transient operation state can be accurately displayed relative to a calibrated threshold level using a servo operated voltage balancing circuit in conjunction with a null-balancing circuit so as to surprisingly indicate heat flow within the fluid-carrying body under survey, as a function of time.

Also in electrical circuit with meter 10 is signaling circuit 17 for generating visual and/or audio signals to alert an operator of the occurrence of change in fluid flow within body 12, viz., a FLOW condition. In this regard signaling circuit 17 can be activated to indicate the occurrence of such transient fluid flow via energization of lamp indicator 18 and/or of audio indicator 19, or both. Circuit 17 can include a servo operated balancing circuit in operative contact with a null-balancing circuit. Result: control signals can be easily generated so as to drive the lamp indicator 18 and/or audio indicator 19 (the latter preferably including an audio amplifier and a speaker), as such flow conditions occur.

In the application depicted in FIG. 1, note that the upper plate 13 is placed in surface-to-surface contact over a sector of the underside of flowline 12, although the sector involved may be exceedingly small. Signal output of transducer-meter 10 itself is a function of size; for example, for a plate 13-14 having dimensions 1 inch by 1 inch, N is equal to 80, i.e., there are 80 thermocouples between the plates 13-14; while a plate having the dimensions 2 inches by 2 inches has 360 thermocouples in contact therewith. Hence, signal output is directly proportional to plate size. However, thermal resistance introduced by either combination is negligible. Furthermore, no power supply is needed for operation of the transducer-meter 10 of the present invention since the latter operates on the thermopile principle.

OPERATIONS

Operation of the flux transducer-meter in the present invention is an application of thermopile principles in which temperature differences (delta-T) between plates 13 and 14 connecting to a plurality of thermocouples in combination generate a potential signal proportional to the temperature difference. That is to say, both plates 13 and 14 and the plurality of N thermocouples form elements of the aforementioned thermopile circuit. Result: a surprisingly sensitive millivolt output is produced proportional to the heat flux passing through the transducer-meter 10 as a direct function of change in fluid flow within the relief flowline 12 (either in gas or liquid phase, or both).

Calibration of the transducer-meter 10 is required, and usually each meter 10 is provided with a separate calibration curve and temperature correction curve. In this regard a particular adaptable transducer-meter 10, including useful calibration and correction curves, is manufactured by International Thermal Instrument Company, Del Mar, Calif., to the following specification:

Temperature range: $-425°$ F. to 550° F.
Material: Polyimide-glasses
Max Flux Density: $10^6$ BTU/Hr Ft$^2$
Time Constant: 1 Second (Approx)
Output Resistance: 30 Ohms to 500 Ohms
Sizes: $\frac{1}{4}'' \times \frac{1}{4}''$ to $4'' \times 4''$
Accuracies: 10% to 1%
Sensitivities: 7 to 250 BTU/Hr/Ft$^2$/Mv.

To provide a permanent record for operator perusal, the recorder 11 includes a mechanically driven stylus 15 which charts amplitude as a function of time on graph 16, i.e., the recorder 11 records the ganged signal outputs from the transducer-meter 10 as a function of time.

Graph 16 is shown in detail in FIG. 2

Note in FIG. 2 that curve 20 charts output signal level from the transducer-meter 10 in an actual application, as a function of time (in hours). In the application shown, medium peaks 21A and 21B occur early and late, respectively, in the depicted monitoring cycle, while large peak 22 occurs during the middle of the same cycle. Between such peaks is baseline signal level 24.

Each peak 21, 21A or 22 signifies that flow of fluids had occurred within the flowline under survey (where the particular transducer-meter 10 had been attached) over the period of time designated. Slopes of the peaks 21A, 21B, or 22 are also of interest. Since they vary rather slowly with time above level 24, they indicate that heat flow proportional to fluid flow was in a transient mode as opposed to a steady state condition. (That is to say, temperatures associated with fluid flow vary with time over the periods of interest at the boundaries of interest.)

Where the temperatures of the interior of the body 12, for example, abruptly change (as by the occurrence of fluid flow within the flowline 12 so that a temperature difference that previously existed there occurs), there is a period of adjustment in the temperature (see FIG. 6). Prior to such change the temperature of body 12 is equal to that of the air surrounding the body 12. But during flow, the temperature of the fluid undergoes a step change 23, as shown, while temperature existing at the boundary of the body 12 itself in the vicinity of the transducer-meter 10 undergoes a slower change, as along curve 25 of FIG. 6. Note that since in most applications the periodicity of the fluid flow is irregular, the length of time of fluid flow is unpredictable, and there are variables external to the body 12 itself, operations within the knee 26 of the curve 25 is rather a common occurrence. That is to say, the transducer-meter 10 operates in a transient mode.

But if the system operates within region 27 of the curve 25 such operations would be termed "steady state" and would not be as efficient at indicating the occurrence of flow conditions within the body 12 as when the invention is operated in a transient mode. Reason: under steady state conditions, the temperature differential can decrease due to the fact that the heat capacity of the fluid is usually so much less than that of the body 12 on a normalized basis. Result: under many detection situations only a slight rise in overall skin temperature of the body 12 would occur if detection operations were carried out under steady state conditions.

FIG. 3 illustrates the present invention in still more detail.

As shown, transducer-meter 10 has been improved whereby it can operate in field applications with greater efficiency, such as in a location adjacent to a pipeline 28 remote form a central control center (not shown). In the application contemplated by the present invention the pipeline is supported above the ground 31 by support means 32 and is part of a flowline network monitored by the central control center, the latter receiving a series of signals from a multiplicity of transducer-meters placed at strategic locations within the flowline network under survey. Such signals enter into the control center—without inline amplification—via conduits Mo, M2 ... M and thence to a corresponding series of M recorders and signaling circuits all positioned at the center. Centrally locating the M multiplicity of recorder and signaling circuits in electrical connection with a corresponding M plurality of improved transducer-meters, allows a single operator at the control center to monitor flow conditions of several branches of the network simultaneously.

That is to say, a single operator can monitor flow conditions in a multiplicity of pipelines irrespective of extent of his other duties and responsibilities. In this regard, M can range from 5 to 20 with 10 being preferred because each control center traditionally serves 10 operating units where usual refinery or chemical complex performance standards, are in effect.

Response is further aided by the fact that each meter 10 is located a distance Z from the axis of symmetry CL of each control valve 40 whereby in the NO-FLOW condition a steady state ambient temperature state exists in the vicinity of the meter and flowline, but in the subsequently occurring FLOW condition, a transient detection state becomes easily established. In that way, the resulting change in signal level at the control center associated with a FLOW condition is more easily identified since the detected flux level is specifically related to the transient thermal detection mode only.

FIG. 7 shows such a plurality of recorders 11 and signaling circuits 17, located within a control center, for the purpose of monitoring flow conditions via transducer-meters 10 placed on several pipelines 28. Additionally, the recorders 11 and signaling circuits 17 electrically connect to the transducer-meters 10 by way of the conduits Ml, M2, M3, M4 and M5 previously shown in FIG. 3. Note also that such additional pipelines 28 (of FIG. 7) are positioned behind and hence hidden from view by the depicted pipeline 28 of FIG. 3. Note further that the locations of the transducer-meters 10 along the pipelines 28 are shown as being distances Z from individual control valves 40 depending upon temperature conditions along the pipelines 28 determined as explained hereinafter.

That is to say, in establishing the prime location of each of the M series of meters relative to a corresponding control valve 40 (i.e., establishing the Z distance on the downstream side of flow), the nature of the existing temperature gradient surrounding the valve 40, is of importance.

Returning to FIG. 3, where liquids are blocked by the valve, the temperature gradient at the axis of symmetry of the flowline 28 has been found to decrease as a function of distance along line at a constant slope until the latter becomes essentially equal to the temperature of the surrounding air, i.e., reaches the steady state ambient temperature of the system. In such case the meter 10 can be located at such point of intersection provided, the latter is not positioned so far from the valve 40 that in the FLOW condition, the transient operating mode ends before detection of the fluid by the meter 10, can occur; that is to say, if the heat flow in the flowline 28, due to FLOW, changes from a transient to a steady state condition, the meter 10 cannot detect such condition with regularity.

Where a gas phase is upstream of the valve, the temperature gradient in the vicinity of interest, has been found to decrease more steeply as a function of distance along the line and becomes essentially equal to that of the surrounding air in a relatively short horizontal distance measured from the axis of symmetry CL. In such case, the meter 10 is usually located closely adjacent to the vertical plane through flanged end 44 of the valve 40. In that way, as flow occurs, the transient heat flux is assured of being sensed before the flowline 28 and the air that surrounds the former again reach a steady-state temperature condition.

Note also that the radial position of the meter 10 relative to the axis of symmetry of the line, has also been carefully selected to again maximize response during operations.

That is to say, the meter 10 is radially disposed at the underside of the flowline closest to the ground surface 31. In that way the former is always juxtapositioned to minimum liquid flow levels interior of the flowline 28.

FIGS. 4 and 5 illustrate a shielding bonnet 33 for the meter 10 in more detail.

As shown in FIG. 4, bonnet 33 is cylindrical and includes a sidewall 35 forming a cavity 36A open at endwall 37 beneath the line 28 but closed at its opposite end in contact with line 28. Strap 38, circumferentially stretching about the line 28 semipermanently supports the bonnet 33 relative to the line 28.

Since it is desirable to have a large thermal resistance at its contact surface with the line 28, boundary 39 of the bonnet 33 can be gnarled to increase the number of air spaces in the plane of the endwall.

To avoid further thermal interference, the bonnet 33 is also centered about the former (but avoids direct metal-to-metal contact therewith) by having a somewhat annular air space 36B therebetween, see FIG. 5. Sidewall 35 of the bonnet 33 is also provided with openings 42, through which the electrical conductors 29 extend, see FIG. 5. These electrically connect each M transducer-meter 10 with associated recorder and/or signaling circuit via conduit Mo, M. . . . M, as previously discussed.

The size of the openings 42 can be enlarged to fit snugly about the conductors 29 if desired. In that way, rain, moisture, or other environmental factors can be somewhat inhibited from directly contacting the transducer-meter 10 of the present invention, during operations thereof. Hence, the latter's operations remain stable once calibration has occurred and its background signal level correspondingly remains at a minimum level.

Note also that the conductors 29 can include a receptacle 41 (FIG. 3) so as to allow easy relocation of the bonnet-transducer assembly from place to place along the line 28, as required.

In order to further minimize background noise level, the transducer-meter 10 of the present invention must be firmly attached to the line 28. In this regard a conventional heat conductor adhesive 43 (see FIG. 4) having a high conductivity value such as between 15–20 Btu's per hour per degree (F.) per square foot per inch of thickness can be used. In this regard, an adhesive manufactured by Dow Corning, under the trade name DC #340 has proven adequate.

Although the invention has been described in terms of specific embodiments set forth in detail, it should be understood that such description is by way of illustration only and the invention is not necessarily limited thereto since alternatives will be readily apparent to those skilled in the art, but rather by the scope of the following claims.

What is claimed is:

1. Method of providing detection of fluid flow in a series of relief flowlines at a central control center, wherein activation of a series of control valves controlling discharge can be pinpointed, comprising:
   (a) positioning at least one of a series of transducer-meters for sensing heat flux in a selected location that is (i) radially disposed exterior to at least one of said flowlines in heat conducting contact therewith while maintaining integrity of said at least one flowline radially intact and (ii) linearly disposed along said one flowline closely adjacent to at least one of said series of control valves so that fluid discharge through said at least one control valve can be accurately detected;
   (b) simultaneously feeding signals from said one of transducer-meters to a corresponding series of recorder and signaling circuits located at said central control center wherein a single operator can monitor all recorder and signaling circuits substantially unaided;
   (c) for each of said series of meters, continuously recording at an associated recorder and signaling circuit, a baseline signal constant with time but above a predetermined threshold level, said baseline signal being indicative of a NO-FLOW steady state temperature condition within said at least one flowline at said selected location;
   (d) monitoring change in fluid flow interior of said one flowline at said selected location by generating and recording a transient cascaded output signal proportional to transient heat flux detected exterior of said one flowline; at said control center, said recorded transient signal deviating in amplitude from said prior recorded baseline signal whereby said change in fluid flow can be accurately indicated thereby indicating the occurrence of said transient cascaded signal output at said control center so as to pinpoint location of one or more of said series of control valves undergoing discharge.

2. Method of claim 1 wherein the number of transducer-meters being monitored by a corresponding series of recorder and signaling circuits at said central control center is between 5 and 20.

3. Method of claim 1 in which the number of transducer-meters being monitored by a corresponding series of recorder and signaling circuits at said central control center is 10.

4. Method of claim 1 in which the substep of linearly disposing said at least one transducer-meter along said one flowline in a selected location adjacent to said associated control valve is characterized by determining said location based on
   (i) type of temperature gradient existing at the axis of symmetry of said one flowline in the vicinity of a joint between said control valve and said one flowline, in a NO-FLOW condition, and
   (ii) fluid type to be monitored.

5. Method of claim 4 in which said fluid to be monitored is a gas and said substep of linearly disposing said at least one transducer-meter is characterized by placing said meter closely abutting a plane passing through flanged end of said control valve along said one flowline wherein temperature at said selected location is equal to that of the ambient air exterior of said flowline in a no-flow condition.

6. Method of claim 4 in which the fluid to be monitored is a liquid and the substep of linearly disposing said at least one transducer-meter along said one flowline adjacent to said associated control valve is characterized by placing said meter a distance that is measured from the line of symmetry of said control valve to a location beyond said flanged end of said valve with said one flowline, where temperature at said selected location is equal to that of one ambient air exterior of said flowline, in a no-flow condition.

7. Method of claim 4 in which the substep of linearly disposing said transducer-meter along said one flowline includes surrounding said each heat flux sensing transducer-meter with a weathering bonnet attached in substantially non-heat conducting contact with said at least one flowline, and having a cavity enclosing, to a substantial degree, said transducer-meter, so as to increase baseline and transient signal response of the latter.

8. A method of detecting flow in any branch of a conduit system having a plurality of branches that may be contributing flow to said conduit system through operation of a series of associated control valves, comprising:
   positioning M thermopiles in a series of branches of said system, each being disposed as a selected location closely adjacent to at least one associated control valve;

simultaneously feeding signals from each of said M thermopiles to a corresponding series of M recorder and signaling circuits located at a central control center wherein a single operator can monitor all M recorder and signaling circuits substantially unaided; and for each of said series of M thermopiles, continuously recording at an associated recorder and signaling circuit, a baseline signal constant with time but above a predetermined threshold level, said baseline signal being indicative of a NO-FLOW steady state temperature condition within the respective branch of said system at said selected location whereby changes in the fluid flow as discharge through said associated control valve in any of said branches occurs, can be detected by measuring the transient signal generated by the thermopile proportional to transient heat flux at said selected location exterior of a branch contributing flow to said conduit system, said recorded transient signal deviating in amplitude from said prior recorded baseline signal.

* * * * *